(12) United States Patent
Smirnov (10) Patent No.: US 12,405,516 B2
(45) Date of Patent: Sep. 2, 2025

(54) CAMERA MODULE

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 87 days.

(21) Appl. No.: 18/402,134

(22) Filed: Jan. 2, 2024

(65) Prior Publication Data

US 2024/0319567 A1   Sep. 26, 2024

(30) Foreign Application Priority Data

Mar. 23, 2023  (KR) .......................... 10-2023-0038185

(51) Int. Cl.
G03B 17/12 (2021.01)
G03B 5/00 (2021.01)
G03B 13/36 (2021.01)
G03B 30/00 (2021.01)

(52) U.S. Cl.
CPC .............. *G03B 17/12* (2013.01); *G03B 5/00* (2013.01); *G03B 13/36* (2013.01); *G03B 30/00* (2021.01); *G03B 2205/0069* (2013.01)

(58) Field of Classification Search
CPC .......... G03B 17/12; G03B 30/00; G03B 5/00; G03B 13/36; G03B 2205/0069
USPC .................................................. 348/208.99
See application file for complete search history.

(56) References Cited

U.S. PATENT DOCUMENTS

| | | | |
|---|---|---|---|
| 2021/0223509 A1* | 7/2021 | Yeo | ........................ G03B 5/00 |
| 2021/0397069 A1* | 12/2021 | Shabtay | ............... G02B 13/004 |
| 2022/0091363 A1 | 3/2022 | Kang et al. | |
| 2022/0128886 A1 | 4/2022 | Shabtay et al. | |

FOREIGN PATENT DOCUMENTS

| | | |
|---|---|---|
| JP | 6133562 B2 | 5/2017 |
| KR | 10-2010-0109831 A | 10/2010 |
| KR | 10-2010-0128366 A | 12/2010 |
| KR | 10-1005772 B1 | 1/2011 |
| KR | 10-2022-0040310 A | 3/2022 |

OTHER PUBLICATIONS

Korean Office Action Issued on May 19, 2025, in Counterpart Korean Patent Application No. 10-2023-0038185 (6 Pages in English, 5 Pages in Korean).

* cited by examiner

*Primary Examiner* — Joel W Fosselman
(74) *Attorney, Agent, or Firm* — NSIP Law (57) ABSTRACT

A camera module includes a first housing, a cover member movably disposed in the first housing in an optical axis direction via a first elastic member, a lens holder disposed inside the first housing, a movable holder movably disposed inside the lens holder in an optical axis direction via a second elastic member and having a lens barrel, and a pop-up actuator including a driving magnet and a driving coil disposed facing each other on the first housing and the cover member and configured to drive movement of the cover member in the optical axis direction.

20 Claims, 6 Drawing Sheets

CAMERA MODULE

CROSS-REFERENCE TO RELATED APPLICATIONS

This application claims the benefit under 35 USC 119(a) of Korean Patent Application No. 10-2023-0038185 filed on Mar. 23, 2023, in the Korean Intellectual Property Office, the entire disclosure of which is incorporated herein by reference for all purposes.

BACKGROUND

1. Field

The present disclosure relates to a camera module.

2. Description of the Background

Camera modules may be employed in mobile communication terminals such as smartphones, tablet PCs, laptop computers, and the like.

An auto focus function and an optical image stabilization function may be employed in such camera modules to generate a high-resolution image.

On the other hand, an objective of mobile communication terminals may be a thinner profile, and as a result, as the thickness of the terminals are reduced, it may become difficult to implement a high resolution camera module therein. Accordingly, a pop-up camera may improve camera performance by implementing a structure in which a portion of a lens pops up (protrudes) externally when the camera is driven.

However, to implement a pop-up camera, a separate actuator for driving a pop-up may be required, and accordingly, there may be a problem in that the overall structure of the camera may become more complicated and larger.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first housing, a cover member movably disposed on the first housing in an optical axis direction via a first elastic member, a lens holder disposed inside the first housing, a movable holder movably disposed inside the lens holder in the optical axis direction via a second elastic member and having a lens barrel, and a pop-up actuator including a driving magnet and a driving coil disposed facing each other on the first housing and the cover member and configured to drive movement of the cover member in the optical axis direction.

The camera module may further include a second housing surrounding the first housing externally.

The camera module may further include a sealing member disposed between the second housing and the cover member.

The second elastic member may apply a pop-up force for popping up the movable holder by pushing the movable holder upward in the optical axis direction, and the first elastic member may apply a force to inhibit pop-up by pulling the cover member downwardly in the optical axis direction.

The pulling force of the first elastic member may be greater than the pushing force of the second elastic member.

When the pop-up actuator is not driven, the movable holder may maintain a pressed state in contact with the cover member.

The driving force of the pop-up actuator may be greater than pulling force of the first elastic member.

The lens holder may include a fixed lens therein.

The movable holder may include a first guide in a shape of a side of a cone that becomes narrower toward a top in the optical axis direction, on an outer surface, the lens holder may include a second guide having a shape corresponding to the first guide, on an inner surface, and the second guide may be guided by the first guide to implement centering of the lens barrel.

The first guide or the second guide may include a recess of a groove shape drawn inwardly.

The movable holder may include at least three protrusion-shaped third guides on an outer surface, the lens holder may include a fourth guide having a groove shape corresponding to the third guide, on an inner surface, and the third guide may be guided by the fourth guide to implement centering of the lens barrel.

The camera module may further include a ball member disposed between the first housing and the cover member, configured to guide movement of the cover member in the optical axis direction.

The camera module may further include a pulling yoke disposed on a back side of the coil, and the ball member may be supported by attraction of the magnet and the pulling yoke.

The ball member may be divided and disposed in at least two locations, wherein a virtual line connecting centers of the divided and disposed ball members may penetrate the lens barrel.

A portable electronic device may include the camera module.

In another general aspect, a camera module includes a first housing accommodating a lens holder, a cover member movably coupled to the first housing by a first elastic member urging the cover member to the first housing in a first direction, a movable holder coupled to the lens holder by a second elastic member urging the movable holder away from the lens holder in the first direction, and an actuator disposed inside the cover member and configured to move the cover member in the first direction.

The actuator may include a coil and a magnet disposed on the first housing and the cover member to face each other, the first elastic member may compress the second elastic member, and the actuator and the second elastic member may extend the first elastic member.

The camera module may further include one or more of an autofocus actuator configured to move the lens holder relative to the first housing in an optical axis direction and an optical image stabilization actuator configured to move the lens holder relative to the first housing in a direction perpendicular to the optical axis direction, and the one or more of the autofocus actuator and the optical image stabilization actuator may be disposed inside the first housing.

The cover member may press the movable holder into the lens holder in the first direction by the urging of the first elastic member, and the actuator may be configured to drive the cover member to space the cover member away from the movable holder in the first direction to allow the second elastic member to extend in the first direction to drive the movable holder away from the lens holder in the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module having a significantly simple overall structure while sufficiently implementing a pop-up function of the camera module.

An aspect of the present disclosure may provide a camera module in which an increase in overall volume may be significantly reduced and a terminal having a thinner profile by including a pop-up camera having a relatively simple structure.

A camera module according to one or more example embodiments may be provided, and may be applied to portable electronic devices such as mobile communication terminals, smart phones, and tablet PCs.

Figure 1:
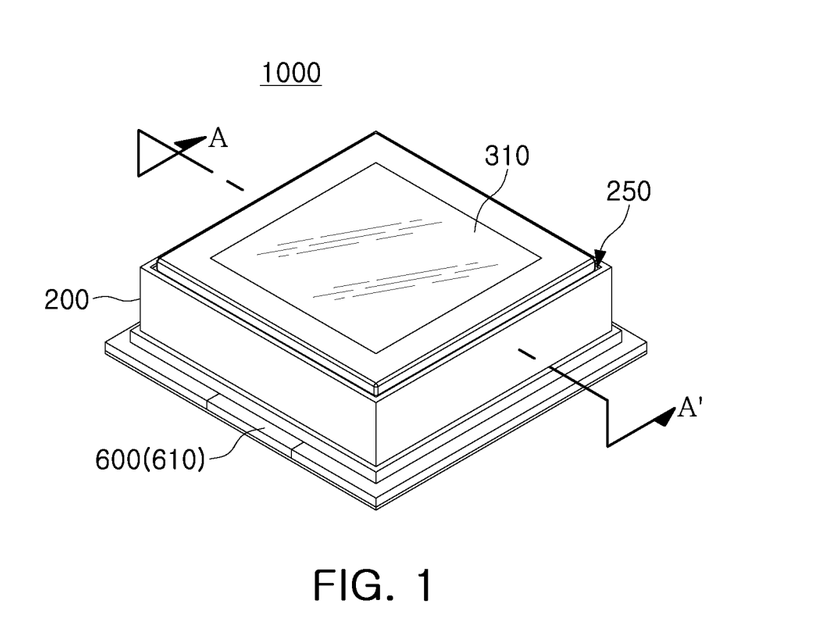
FIG. 1 is a perspective view of a camera module according to one or more example embodiments.
Figure 2:
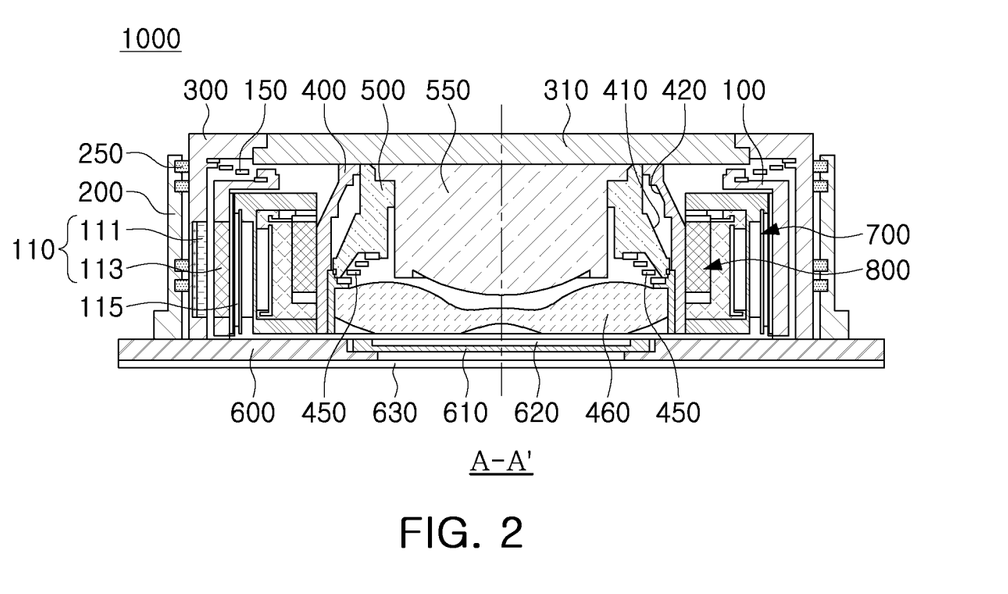
FIG. 2 is a cross-sectional view of a camera module (before pop-up) according to one or more example embodiments.
Figure 3:
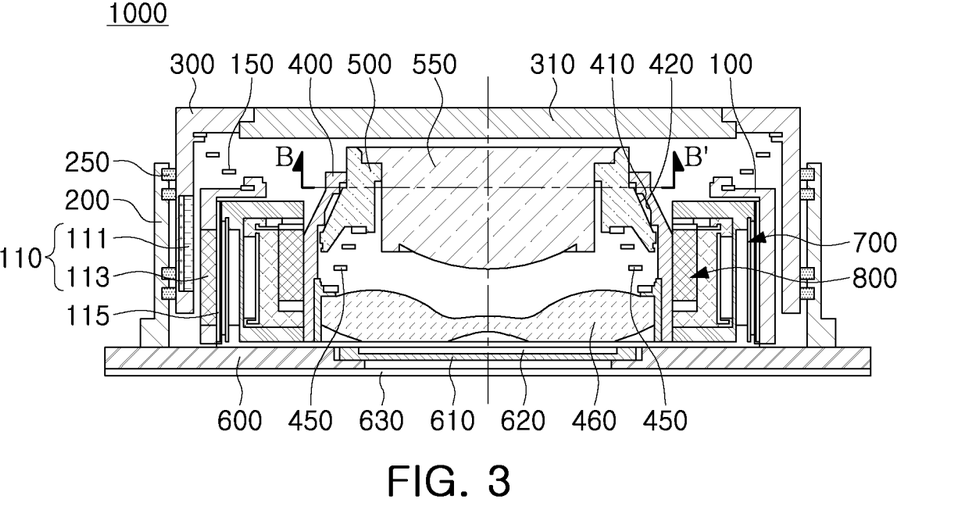
FIG. 3 is a cross-sectional view of a camera module (after pop-up) according to one or more example embodiments.

FIG. 1 is a perspective view of a camera module according to one or more example embodiments, and FIG. 2 is a cross-sectional view of a camera module (before pop-up) according to one or more example embodiments, and FIG. 3 is a cross-sectional view of a camera module (after pop-up) according to one or more example embodiments.

Referring to FIGS. 1 to 3, a camera module 1000 according to one or more example embodiments has a structure in which a portion of a lens pops up (protrudes) externally when the camera is driven. FIG. 2 illustrates the structure before pop-up, and FIG. 3 illustrates the structure after a lens barrel 550 pops up upward in the optical axis direction. In FIGS. 2 and 3, the direction from top to bottom or bottom to top of the drawing corresponds to the optical axis direction, and the upper portion of the figure is referred to as the upper portion in the optical axis direction, and the lower portion of the figure is referred to as the lower portion in the optical axis direction.

Referring to FIG. 2, a cover member 300 supported by a first elastic member 150 in the first housing 100 is pressed downwardly in the optical axis direction to move a movable holder 500 and the lens barrel 550 downwardly in the optical axis direction. Accordingly, a state in which the lens barrel 550 does not pop up is maintained. In the structure illustrated in FIG. 2, the first elastic member 150 itself may act as the compressive force at which the spring tends to be compressed in the direction of the optical axis.

Referring to FIG. 3, the cover member 300 is raised upward in the optical axis direction by the driving force of a pop-up actuator 110, and the cover member 300 pressing the movable holder 500 or the lens barrel 550 from above in the optical axis direction is released, and the movable holder 500 and the lens barrel 550 pop up upward in the optical axis direction. The movable holder 500 is supported by a lens holder 400 via a second elastic member 450, and thus automatically pops up upward in the direction of the optical axis when the pressing force from above is released. In the structure illustrated in FIG. 3, as the second elastic member 450 itself, tensile force for the spring to be tensioned in the direction of the optical axis may act. In addition, as illustrated in FIG. 3, when the movable holder 500 pops up, a glass 310 of the cover member 300 and the lens barrel 550 do not come into contact, and accordingly, the pop-up actuator 110 alone may drive the cover member 300.

The popped-up movable holder 500 is pressed again as illustrated in FIG. 2 by the cover member 300 having pressing force acting downwardly in the optical axis direction, when the driving of the pop-up actuator 110 is terminated.

For example, the second elastic member 450 applies pop-up force, force for popping up the movable holder 500 by pushing the movable holder 500 downwardly in the optical axis direction, and the first elastic member 150 may apply force to inhibit pop-up by pulling the cover member 300 downwardly in the optical axis direction.

Hereinafter, the overall structure and each substructure will be described in detail with reference to the drawings.

The camera module 1000 according to one or more embodiments may include at least a first housing 100, the cover member 300, the lens holder 400, and the movable holder 500. The movable holder 500 may include a pop-up driven lens barrel 550, and the pop-up actuator 110 may be provided for driving the pop-up. In addition, the first housing 100 and the lens holder 400 are fixing members, and the cover member 300 and the movable holder 500 are pop-up driven movable members.

The first housing 100 serves as a body in which the overall configuration of the camera module is provided, and the lens holder 400 and the movable holder 500 including the lens barrel 550 may be provided therein. In addition, an autofocus actuator (AF actuator) 700 and an optical image stabilization actuator (OIS actuator) 800 improving the performance of the camera module 1000 may be provided in the first housing 100. Also, a fixed lens 460 may be additionally provided in the first housing 100 to improve optical performance, and the fixed lens 460 may express the lens performance of the camera module together with at least one lens provided in the lens barrel 550 that pops up. The fixed lens 460 is provided in a lower portion in the optical axis direction, together with at least one or more lenses provided in the lens barrel 550, such that optical axes thereof may be overall aligned with each other.

A filter 620 and an image sensor 610 may be provided below the lens barrel 550 and the fixed lens 460 in the first housing 100 in the optical axis direction. The filter 620 may be various filters such as an optical filter, an IR filter and the like. The filter 620 and the image sensor 610 may be mounted in a main board 600, and the main board 600 may be coupled to a lower portion of the first housing 100. In addition, a support plate 630 may be additionally provided on a lower portion of the main board 600 to improve rigidity. The support plate 630 may be formed of SUS material.

The cover member 300 may be provided to be movable in the optical axis direction on the first housing 100 via the first elastic member 150. Also, the cover member 300 may cover the first housing 100 from above, and thus the inside of the first housing 100 may be covered. In addition, the cover member 300 may be provided with a transparent window formed of glass 310, and light may be incident to the lens barrel 550 through the glass 310. The cover member 300 is a member moving when the pop-up is driven in the optical axis direction of the movable holder 500, and accordingly, the pop-up actuator 110 to be described below may be provided. The pop-up actuator 110 may be a voice coil motor including a magnet 111 and a coil 113, and accordingly, the cover member 300, a moving member, may be provided with the magnet 111 or the coil 113.

On the other hand, in these one or more embodiments, the pop-up actuator 110 is used only when driving the pop-up of the movable holder 500, and when the pop-up is terminated or the pop-up is not performed, a state in which the movable holder 500 is maintained to be pressed downwardly by the elastic member 150 in the optical axis direction may be maintained.

The cover member 300 may be provided on the first housing 100 to receive force pressed downwardly in the optical axis direction via the first elastic member 150. Accordingly, when the pop-up actuator 110 is not driven, the movable holder 500 and the lens barrel 550 may also be pressed downwardly in the optical axis direction by the cover member 300. For example, the movable holder 500 or the lens barrel 550 may maintain contact with the cover member 300 when the pop-up actuator 110 is not driven.

In this case, the first elastic member 150 may be a coil spring. One side of the first elastic member 150 may be fixed to the upper edge of the first housing 100 and the other side thereof may be fixed to the inner upper edge of the cover member 300. Also, the first elastic member 150 is not limited to a coil spring, and elastic members having various structures may be used.

The lens holder 400 may be provided inside the first housing 100. The lens holder 400 forms a fixing member together with the first housing 100. The fixed lens 460 may be provided in the lens holder 400, and the fixed lens 460 may be aligned with a lens provided in the moving lens barrel 550, in an optical axis direction. The lens holder 400 may be fixed to the main board 600.

The movable holder 500 may be provided inside the lens holder 400 to be movable in the optical axis direction via the second elastic member 450. In the movable holder 500, the lens barrel 550 including at least one lens may be provided.

In these one or more embodiments, the pop-up actuator 110 is used only when driving the pop-up of the movable holder 500, and when the pop-up is terminated or the pop-up is not performed, the movable holder 500 may be maintained pressed downwardly in the optical axis direction by the elastic member 150.

The cover member 300 is provided to receive force pressed downwardly in the optical axis direction via the first elastic member 150, on the first housing 100, and accordingly, when the pop-up actuator 110 is not driven, the movable holder 500 and the lens barrel 550 may also be pressed downwardly in the optical axis direction by the cover member 300. For example, the movable holder 500 or the lens barrel 550 may maintain contact with the cover member 300 when the pop-up actuator 110 is not driven.

Accordingly, in these one or more embodiments, the pressing force of the second elastic member 450 may be smaller than the pressing force of the first elastic member 150. For example, the force of the first elastic member 150 pressing the cover member 300 downwardly in the optical axis direction may be greater than the force of the second elastic member pushing the movable holder 500 upward in the optical axis direction. In addition, assuming a state in which the first elastic member 150 requires the greatest amount of force, the pressing force of the first elastic member 150 may be greater than (the pressing force and weight of the second elastic member 450+the weight of the cover member 300+the weight of the movable holder 500+ the weight of the lens barrel 550). For example, basically, the pressing force of the first elastic member 150 may be greater than the pop-up force of the second elastic member 450, the tensile force thereof.

On the other hand, as will be described below, since the driving force of the pop-up actuator 110 should overcome the pressing force of the cover member 300, the pressing force of the first elastic member 150 may be less than the driving force of the pop-up actuator 110.

The second elastic member 450 may be a coil spring. The second elastic member 450 may have one side fixed inside of the lens holder 400 and the other side fixed to the movable holder 500. In addition, the second elastic member 450 is not limited to a coil spring, and elastic members having various structures may be used.

The pop-up actuator 110 may be provided in the first housing 100 and the cover member 300 to face each other.

Also, the pop-up actuator 110 may include the driving magnet 111 and the driving coil 113 that drive movement of the cover member 300 in the optical axis direction. The driving magnet 111 and the driving coil 113 may be disposed to face each other, and may be separately disposed in the first housing 100 and the cover member 300, respectively, and in this case, for example, one may be provided on a fixed member and the other may be provided on a moving member. In the drawing, a structure in which the magnet 111 is provided in the cover member 300, a moving member, and the coil 113 is provided in the first housing 100, a fixed member, is provided, but the present disclosure is not limited thereto. For example, conversely, the magnet 111 may be provided in the first housing and the coil 113 may be provided in the cover member 300.

A second housing 200 that surrounds the first housing 100 and the cover member 300 externally may be further included. Also, a sealing member 250 may be provided between the second housing 200 and the cover member 300.

The cover member 300 is a member moving in the optical axis direction, and accordingly, the lower end of the cover member 300 may or may not come into contact with the main board 600. Accordingly, there may be a problem that the camera module 1000 may not be sealed.

Accordingly, in one or more these embodiments, the second housing 200 that surrounds the camera module 1000 from the outside is provided. The second housing 200 is fixed to the main board 600, and the sealing member 250 may be sufficiently provided between the cover member 300 and the second housing 200 to implement sealing force. In addition, since the cover member 300 moves in the optical axis direction and the second housing 200 is a member fixed to the main board 600, the sealing member 250 may be formed of a relatively good elastic and flexible material in consideration of relative movement thereof.

On the other hand, in one or more of these embodiments, the movable holder 500 moves in the optical axis direction, and the lens barrel 550 provided in the movable holder 500 also moves in the optical axis direction. Also, even when the lens barrel 550 moves, the optical axis alignment of the fixed lens 460 provided in the lens holder 400 and lenses provided in the lens barrel 550 should not be disturbed.

Accordingly, in the present one or more embodiments, a guide of guiding the lens barrel 550 and the fixed lens 460 to be aligned even when the movable holder 500 moves in the optical axis direction in the lens holder 400 may be provided, which will be described later with reference to FIGS. 4 and 5.

Figure 4:
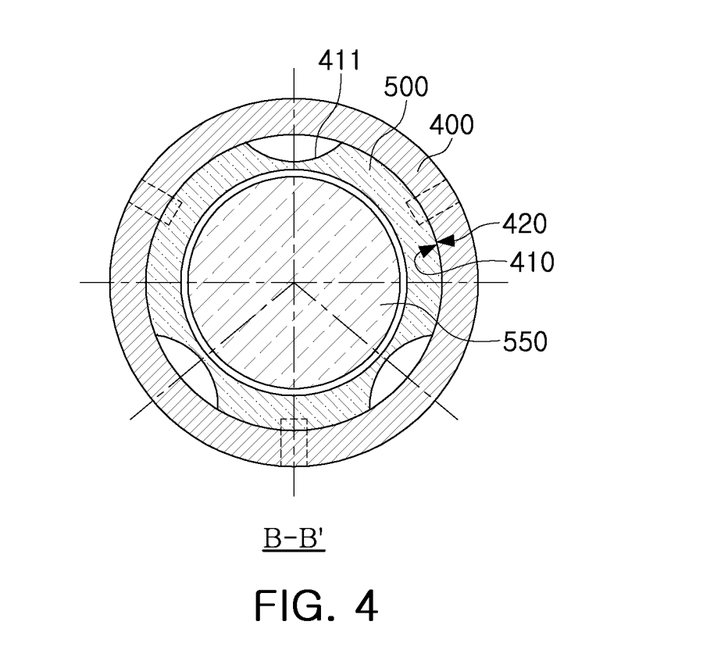
FIG. 4 is a plan view illustrating a centering mechanism of a lens barrel after popping up in a camera module according to one or more example embodiments.

Referring to FIG. 4, the camera module 1000 of this embodiment may include a first guide 410 and a second guide 420 in the movable holder 500 and the lens holder 400, respectively.

The movable holder 500 may include a first guide 410 in the shape of a conical side that becomes narrower toward the top in the optical axis direction, on an outer surface, and the lens holder 400 may have a second guide 420 having a shape corresponding to the first guide 410, on an inner surface thereof. In addition, the second guide 420 is guided by the first guide 410 such that the centering of the lens barrel 550 may be implemented, and accordingly, alignment of the optical axes of the lens barrel 550 and the fixed lens 460 may ultimately be maintained. On the other hand, the first guide 410 or the second guide 420 may be provided with a groove-shaped recess 411 drawn inwardly.

Figure 5:
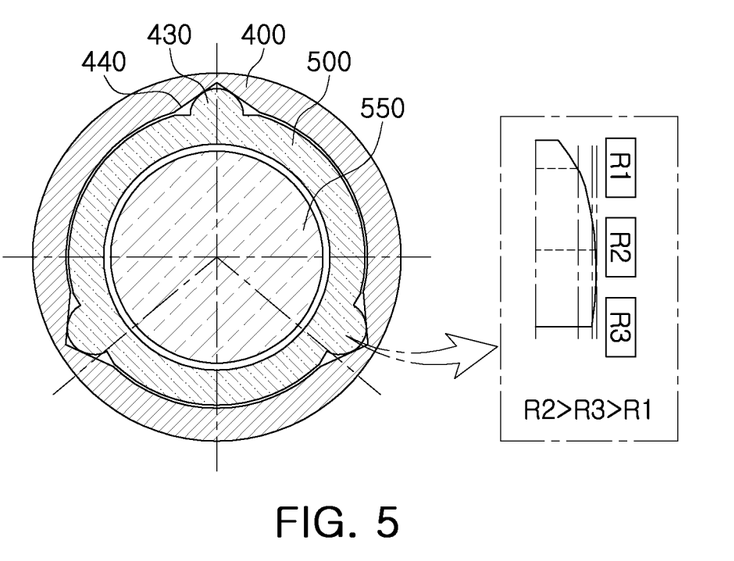
FIG. 5 is a plan view illustrating a centering mechanism of a lens barrel after popping up in a camera module according to one or more other example embodiments.

Referring to FIG. 5, the camera module 1000 of one or more of these embodiments may include a third guide 430 and a fourth guide 440 respectively in the movable holder 500 and the lens holder 400 as guides having different structures.

The movable holder 500 may be provided with the third guide 430 having at least three of a protrusion shape, on an outer surface thereof, and the lens holder 400 may be provided with the fourth guide 440 having a groove shape corresponding to the third guide 430, on an inner surface thereof. In addition, the third guide 430 is guided by the fourth guide 440 such that centering of the lens barrel may be implemented. Accordingly, alignment of the optical axes of the lens barrel 550 and the fixed lens 460 may ultimately be maintained.

On the other hand, the three protrusions constituting the third guide 430 may each extend long in the optical axis direction, and an uppermost diameter thereof in the direction of the optical axis is the smallest, the next is the lowest in the direction of the optical axis, and the middle part may have the largest diameter in the optical axis direction.

In addition, in one or more of these embodiments, the cover member 300 moves in the optical axis direction, and a guide may be required for the natural movement of the cover member 300. The cover member 300 includes the glass 310 through which light is incident, and the cover member 300 should accurately move in the optical axis direction so as not to affect optical performance.

Accordingly, the present one or more embodiments include a guide for guiding the cover member 300 to accurately maintain linear movement in the optical axis direction in the first housing 100, which will be described later with reference to FIGS. 6 to 8.

Figure 6:
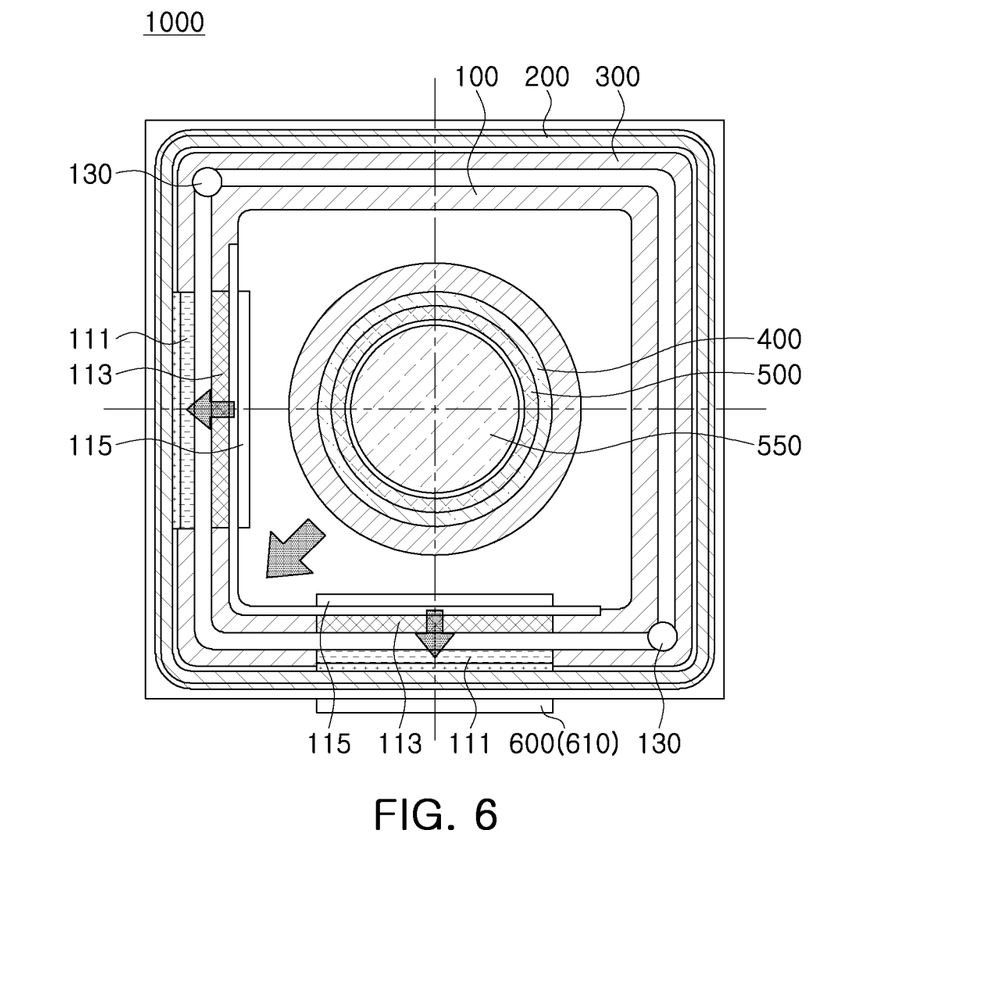
FIG. 6 is a plan cross-sectional view illustrating a structure in which movement of a cover member is guided when a pop-up is driven in a camera module according to one or more example embodiments.

Referring to FIG. 6, a ball member 130 guiding movement of the cover member 300 in the optical axis direction may be provided between the first housing 100 and the cover member 300. A pulling yoke 115 is provided on the back side of the coil 113 constituting the pop-up actuator 110, and the ball member 130 may be supported by the attraction of the magnet 111 and the pulling yoke 115. For example, the cover member 300 may move in the optical axis direction while being supported by the first housing 100 via the ball member 130.

To implement this structure, the ball member 130 is respectively provided in at least two locations, and a virtual line connecting the centers of the divided ball members 130 may pass through the lens barrel 550.

As illustrated in FIG. 6, to strengthen the attractive force of the magnet 111 and the pulling yoke 115 and secure the driving force of the pop-up actuator 110, two sets of pop-up actuators 110 may be provided.

Figure 7:
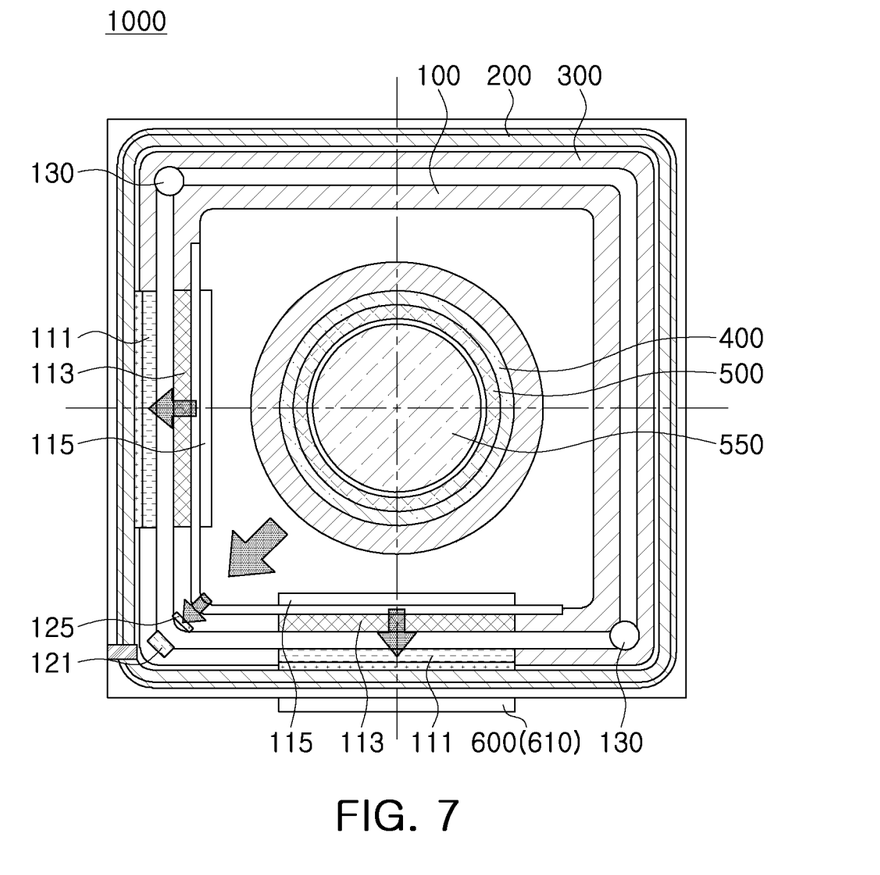
FIG. 7 is a plan cross-sectional view illustrating a structure in which movement of a cover member is guided when a pop-up is driven in a camera module according to one or more other example embodiments.

In addition, as illustrated in FIG. 7, a magnet 121 and a yoke 125 may be provided to add additional pulling force (attractive force) for accurate support of the ball member 130. The magnet 121 and the yoke 125 may be selectively provided on the cover member 300 and the first housing 100, and may be disposed to face each other in the pressing direction of the ball member 130.

Figure 8:
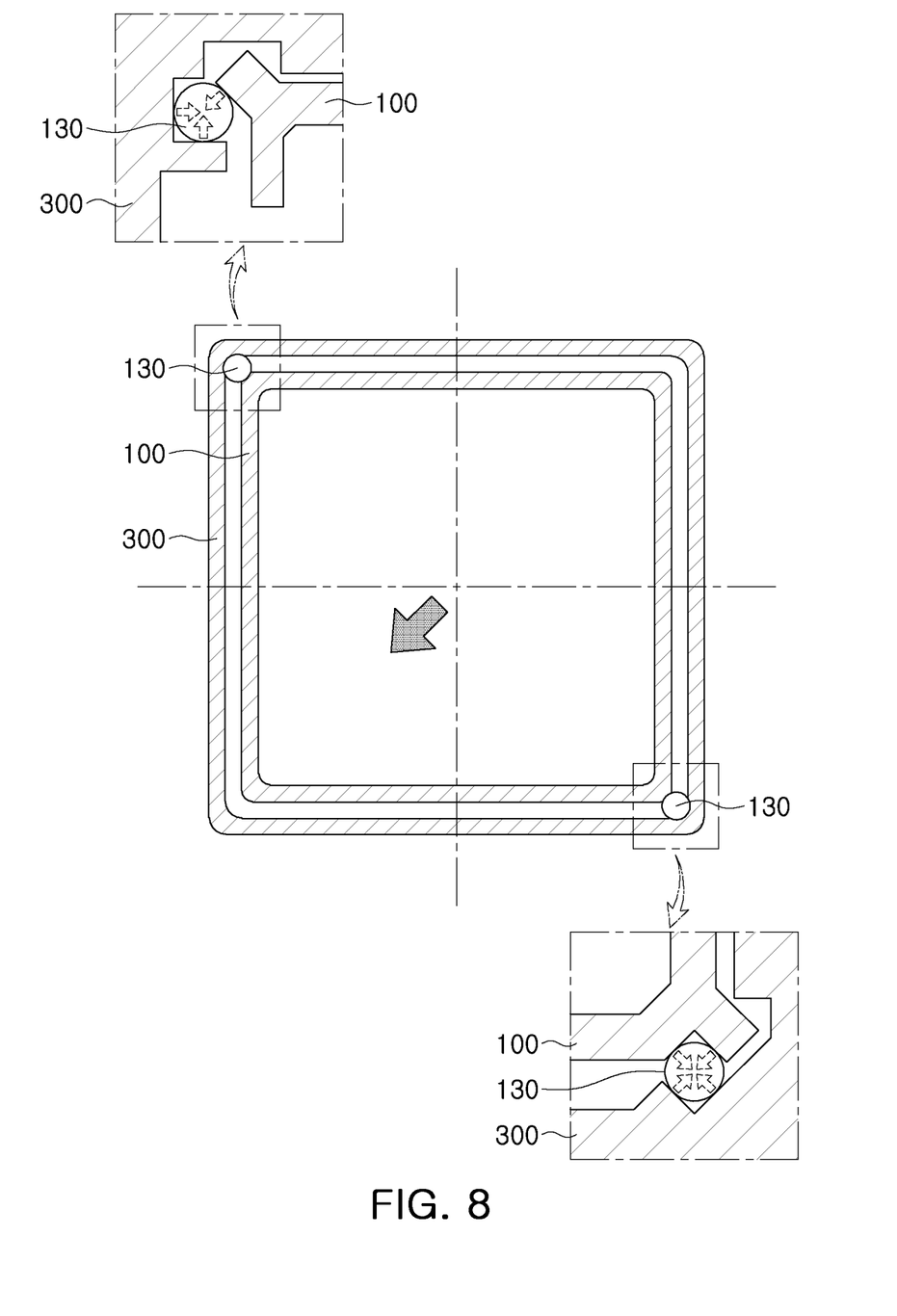
FIG. 8 is a reference diagram illustrating a structure in which movement of a cover member is guided when a pop-up is driven in a camera module according to one or more other example embodiments.

Referring to FIG. 8, an example in which the ball member 130 is disposed between the cover member 300 and the first housing 100 is provided. The ball member 130 is constrained in all directions so as not to escape externally, and may have a structure that may receive support force appropriately.

As set forth above, the camera module according to one or more example embodiments may have a significantly simple overall structure while sufficiently implementing a pop-up function.

The camera module according to one or more example embodiments as disclosed herein presents a pop-up function with a simple structure, thereby significantly reducing an increase in the overall volume and a terminal according to one or more example embodiments as disclosed herein provides a thinner profile by including a camera module configured to pop-up.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a first housing;
a cover member movably disposed on the first housing in an optical axis direction via a first elastic member;
a lens holder disposed inside the first housing;
a movable holder movably disposed inside the lens holder in the optical axis direction via a second elastic member and having a lens barrel; and
a pop-up actuator comprising a driving magnet and a driving coil disposed facing each other on the first housing and the cover member and configured to drive movement of the cover member in the optical axis direction.

2. The camera module of claim 1, further comprising a second housing surrounding the first housing externally.

3. The camera module of claim 2, further comprising a sealing member disposed between the second housing and the cover member.

4. The camera module of claim 1, wherein the second elastic member applies a pop-up force for popping up the movable holder by pushing the movable holder upward in the optical axis direction, and
wherein the first elastic member applies force to inhibit pop-up by pulling the cover member downwardly in the optical axis direction.

5. The camera module of claim 4, wherein the pulling force of the first elastic member is greater than the pushing force of the second elastic member.

6. The camera module of claim 4, wherein when the pop-up actuator is not driven, the movable holder maintains a pressed state in contact with the cover member.

7. The camera module of claim 4, wherein the pop-up actuator is configured to push the cover member upward in the optical axis direction and induce pop-up of the movable holder.

8. The camera module of claim 7, wherein driving force of the pop-up actuator is greater than pulling force of the first elastic member.

9. The camera module of claim 1, wherein the lens holder comprises a fixed lens therein.

10. The camera module of claim 1, wherein the movable holder comprises a first guide in a shape of a side of a cone that becomes narrower toward a top in the optical axis direction, on an outer surface,
   wherein the lens holder comprises a second guide having a shape corresponding to the first guide, on an inner surface, and
   wherein the second guide is guided by the first guide to implement centering of the lens barrel.

11. The camera module of claim 10, wherein the first guide or the second guide comprises a recess of a groove shape drawn inwardly.

12. The camera module of claim 10, wherein the movable holder comprises at least three protrusion-shaped third guides on an outer surface,
   wherein the lens holder comprises a fourth guide having a groove shape corresponding to the third guide, on an inner surface, and
   wherein the third guide is guided by the fourth guide to implement centering of the lens barrel.

13. The camera module of claim 1, further comprising a ball member disposed between the first housing and the cover member, configured to guide movement of the cover member in the optical axis direction.

14. The camera module of claim 13, further comprising a pulling yoke disposed on a back side of the coil,
   wherein the ball member is supported by attraction of the magnet and the pulling yoke.

15. The camera module of claim 13, wherein the ball member is divided and disposed in at least two locations,
   wherein a virtual line connecting centers of the divided and disposed ball members penetrates the lens barrel.

16. A portable electronic device comprising the camera module of claim 1.

17. A camera module comprising:
   a first housing accommodating a lens holder;
   a cover member movably coupled to the first housing by a first elastic member urging the cover member to the first housing in a first direction;
   a movable holder coupled to the lens holder by a second elastic member urging the movable holder away from the lens holder in the first direction; and
   an actuator disposed inside the cover member and configured to move the cover member in the first direction.

18. The camera module of claim 17, wherein the actuator comprises a coil and a magnet disposed on the first housing and the cover member to face each other,
   wherein the first elastic member compresses the second elastic member, and
   wherein the actuator and the second elastic member extend the first elastic member.

19. The camera module of claim 17, further comprising one or more of an autofocus actuator configured to move the lens holder relative to the first housing in an optical axis direction and an optical image stabilization actuator configured to move the lens holder relative to the first housing in a direction perpendicular to the optical axis direction,
   wherein the one or more of the autofocus actuator and the optical image stabilization actuator are disposed inside the first housing.

20. The camera module of claim 17, wherein the cover member presses the movable holder into the lens holder in the first direction by the urging of the first elastic member, and
   wherein the actuator is configured to drive the cover member to space the cover member away from the movable holder in the first direction to allow the second elastic member to extend in the first direction to drive the movable holder away from the lens holder in the first direction.

* * * * *